Patented Oct. 21, 1941

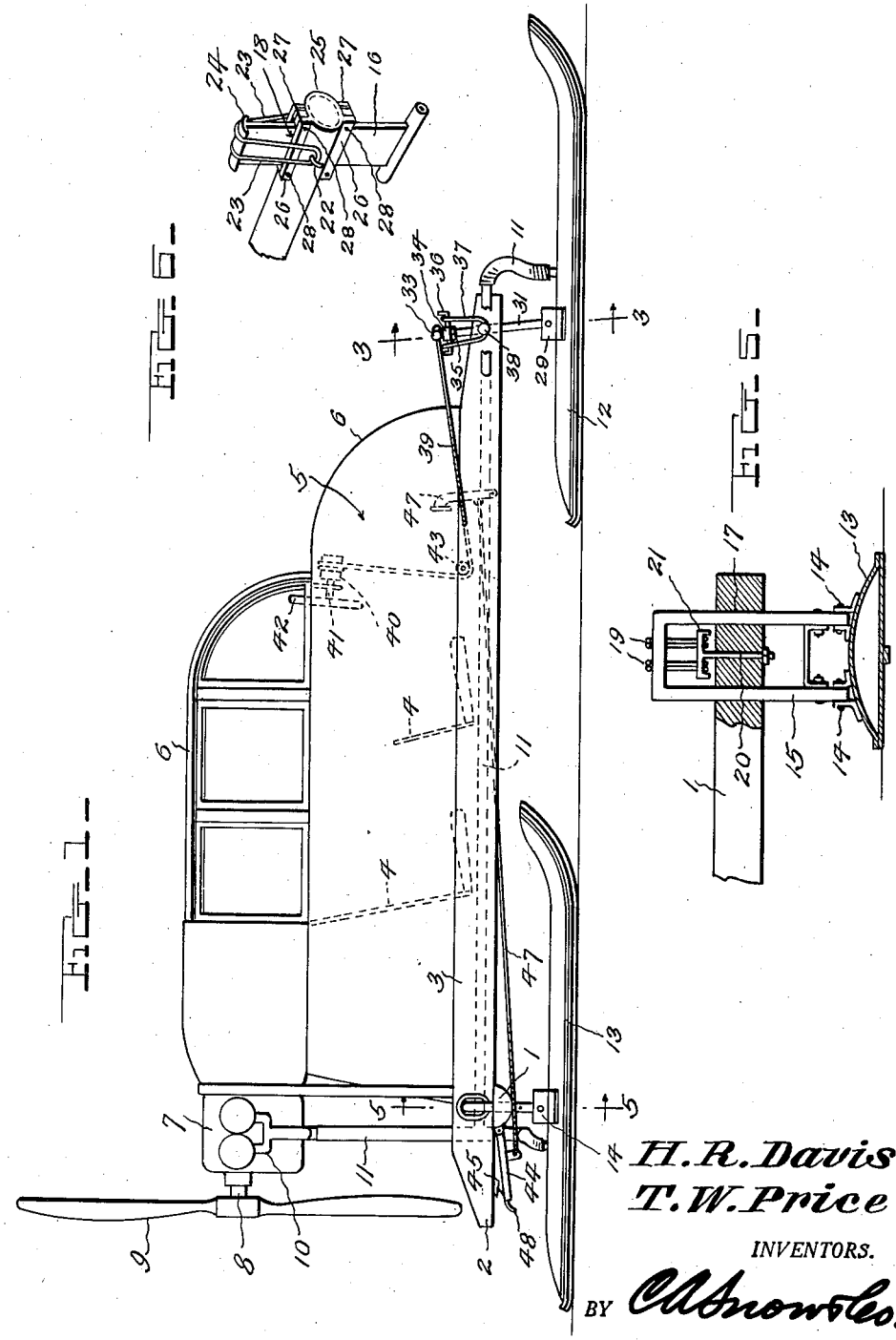

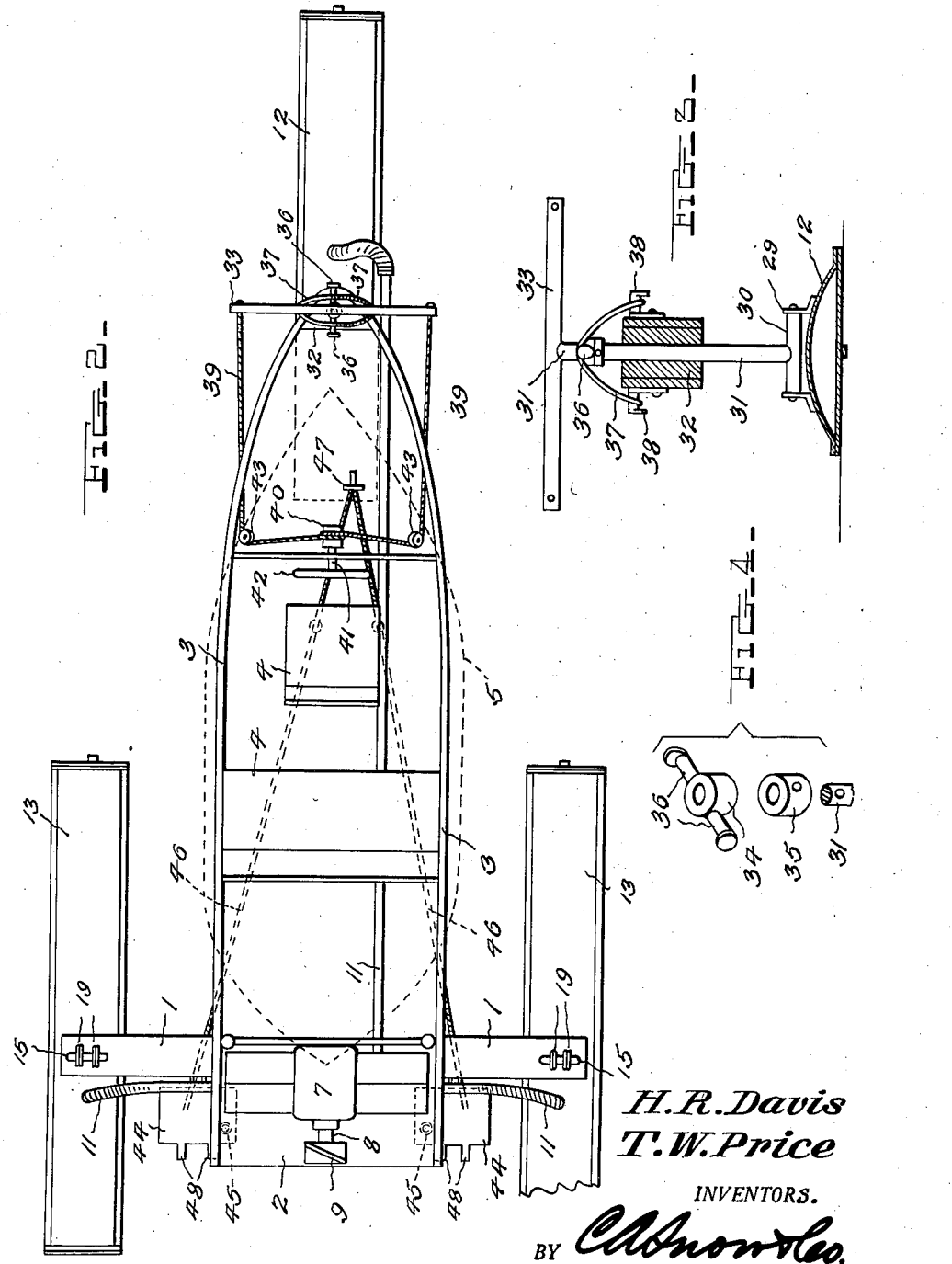

2,259,804

UNITED STATES PATENT OFFICE 2,259,804

SNOW VEHICLE

Howard R. Davis and Thomas W. Price, Durango, Colo.

Application February 17, 1941, Serial No. 379,352

2 Claims. (Cl. 180—3)

This invention relates to a vehicle designed primarily for use on snow covered surfaces, one of the objects being to provide a light-weight machine utilizing three supporting runners to which the body of the machine is connected by cushioning means of novel construction and whereby the weight of the load is distributed substantially equally to the runners and the body is relieved from the twisting and binding action to which it would be subjected when shifted sideways across ditches and obstructions where four supporting runners are employed.

A further object is to provide steering means of simplified construction and a readily operated braking means for retarding or stopping the movement of the vehicle.

A still further object is to provide a snow vehicle adapted to be propelled by an air propeller operating to push the vehicle forwardly, there being a direct connection between the propeller and the motor, thereby avoiding the expensive and complicated transmissions heretofore required and facilitating starting of the motor.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 1 is a side elevation of the vehicle.

Figure 2 is a plan view thereof, the body being removed from the frame and a portion of one of the runners being broken away.

Figure 3 is a section on line 3—3, Figure 1.

Figure 4 is a view showing, in detail, portions of the front steering mechanism separated.

Figure 5 is a section on line 5—5, Figure 1.

Figure 6 is a perspective view of one end portion of a slightly modified form of axle.

Referring to the figures by characters of reference, I designates a transverse axle on which is mounted the rear portion of the elongated forwardly tapered floor 2 of the vehicle body and which floor has longitudinal reenforcing flanges 3 upstanding from the sides thereof and merging at the front end. Above this floor may be located any suitable arrangement of seats 4 and a vehicle body or top 5 is mounted on the flanged floor and can be of any preferred design. For example it may have a forwardly and downwardly rounded nose portion 6 at the front end and located thereabove but stepped back therefrom can be the top 6 having any suitable arrangement of doors and windows. Back of the top is a motor 7 the shaft 8 of which supports a propeller 9 so located and proportioned that the tips of its blades will travel in a circle spaced from the floor and flanges at the rear ends thereof.

These blades are so pitched that when the motor is in operation, the blades will push the vehicle forwardly as hereinafter explained.

The exhaust manifold 10 of the engine can have a pipe 11 extending therefrom for delivering the hot products of combustion at any points desired. For example they can be delivered into a front runner 12 and a pair of rear runners 13 which can thus be heated as disclosed, for example, in our co-pending application, filed November 18, 1940, Serial No. 366,170.

The rear runners or skis 13 are positioned beneath the end portions of the axle I and each runner is provided back from the center thereof with brackets 14 pivotally engaged by the lower end of a slide 15 mounted for up and down movement within the axle I. The slide can be in the form of a frame as shown in Figure 5 or, if preferred, can be in the form of a blade 16. In either case the axle is slotted so that the slide can be properly guided therein, slots for the frame 15 being indicated at 17 in Figure 5 while the slot for the blade 16 is shown at 18 in Figure 6.

In the structure shown in Figure 5 the axle I is yieldingly supported by resilient rings or loops 19 which can be in the form of strong rubber bands the upper portions of which bear downwardly on the upper end of the slide while the lower portions are held to the axle by anchoring means. In Figure 5 this anchoring means is in the form of a bolt 20 extended through and secured to the axle between the side portions of the slide. The bolt has laterally extended hooks 21 detachably engaged by the lower portions of the cushioning elements 19. In the form shown in Figure 6 the resilient loops or rings are folded downwardly over the upper end of the slide 16 and placed in engagement with laterally extending hooks 22 carried by the axle. In this latter form the upper end of the slide 16 can be enlarged to provide a head 24 for transmitting thrust between blade 16 and the cushioning means 23.

As the rear runners 13 are pivotally joined to their slides, they are free to swing upwardly and downwardly while travelling over a rough surface and they are also free to move upwardly and downwardly independently of each other and relative to the axle so as to compensate for irregularities in the surface over which the vehicle is travelling and at the same time protect the occupants of the vehicle from sudden jolts.

In the modified structure shown in Figure 6 the axle 25 is in the form of a tube which can be closed at its ends and which is provided adjacent to each end with upper and lower spaced guide bars 26 and 27. The bars 26 are welded or otherwise joined to the axle close to one side of the slot therein while the bars 27 are adjustably joined to the bars 26 by bolts 28. Thus these bars can be adjusted toward each other to compensate for wear on the parts and, if desired, wear shims can be used between them in an obvious manner.

The single front runner 12 is located under the front or apex of the base or floor portion 2 of the vehicle and is provided with laterally spaced brackets 29 pivotally engaged by the foot 30 of a steering post 31. This post extends through and is journalled within the front end of the vehicle as stated, a fixedly mounted bearing block 32 being provided for that purpose if desired.

The upper end of the steering post is provided with a cross-arm 33 and mounted on the steering post below the cross-arm is a collar 34 supported by a ring 35 which is secured to the steering post. Collar 34 is provided with oppositely extending arms 36 which support a ring or loop 37 of elastic material extending downwardly to brackets or hooks 38 secured to the sides of the bearing or block 32. Thus the loop 37 constitutes a cushion or spring for resisting relative movement of the post 31 and bearing 32 when the vehicle is subjected to a load or when the post exerts an upward thrust.

A steering rope 39 or the like is secured at its ends to the respective ends of the cross-arm 33 and has its intermediate portion wrapped about a drum 40 which, in turn, is secured to the shaft 41 of a steering wheel 42. Guide pulleys 43 can be located at any suitable point so that the flexible connection 39 can be extended properly from drum 40 to the cross-arm 33.

For the purpose of retarding or stopping the vehicle, blades 44 are pivotally connected to the axle 1 adjacent to the sides of the body and these blades can be yieldingly supported normally in any suitable manner, as by means of springs 45. An operating rope 46 serves to connect the bottom portion of each blade 44 to a brake pedal 47 pivotally mounted in the front portion of the body where it can be reached conveniently by the occupant of one of the seats 4. When this foot lever is depressed the two blades 44 will be swung downwardly into contact with the supporting surface of snow or the like and, in order to render the blades more efficient for the purpose of retarding or stopping the motion of the vehicle, each of the blades can be formed with prongs or fingers 48 for digging into the snow.

It will be obvious that the weight of the body and the load carried thereby will be supported at three points, namely, by the resilient members 19 of the two skis or runners 13 and by the resilient member 37 of the front ski or runner 12. Thus the load will be evenly distributed to the three runners and shocks will be absorbed so that the vehicle will travel smoothly and with no discomfort to the riders. The location of the propeller 9 on the shaft 8 of the motor insures rotation at high speed without the use of interposed transmission gearing and also produces a direct forward thrust against the vehicle. The location of the propeller is further advantageous because it is at the back so that the weight of the engine will be between the runners 13 and the propeller is out of the line of vision while the vehicle is travelling forwardly. The vehicle can be easily manipulated and steered and is also advantageous because of its light weight and the low cost at which it can be produced.

Although the brake members have been shown controlled by a single pedal, it is to be understood that, if preferred, a pedal may be provided for each of the brake members so that they can be operated independently of each other. Such an arrangement is so obvious that it is not deemed necessary to show it as a modification.

What is claimed is:

1. A snow vehicle including a floor structure, a body erected thereon, a bearing member in the front end of the structure, an axle fixedly joined to the rear portion of the structure, said axle being slotted adjacent to its ends, slides mounted in the slots, elastic loops anchored to the axle and extending over the slides for yieldingly restraining the upward movement of the slides relative to the axle and the downward movement of the axle relative to the slides, rear side runners pivotally connected to the lower ends of the slides, a steering post rotatably and slidably mounted in the bearing member, a steering runner pivotally connected to the steering post, a cross arm on the post, said arm and post being relatively rotatable, a support on the post for the cross arm, resilient loops extending over the cross arm and anchored to the bearing member for resisting relative up and down movement of the post and bearing member, a means within the body and under the control of the occupant for actuating the steering post, and an air propeller and a motor for driving the same, both carried by the back portion of the body.

2. A snow vehicle including an elongated tapered floor, upstanding reenforcing flanges at the sides thereof, a motor-driven propeller supported on and above the rear portion of the floor, a transverse axle secured to the floor beneath the motor-driven propeller, said axle being slotted adjacent to its ends, slides movable upwardly and downwardly within the slots, runners pivotally connected to the lower ends of the slides, elastic loops extending over and bearing downwardly against the slides, means for anchoring the loops to the axle, a yieldingly restrained post mounted for up and down sliding movement and for rotation within the forward portion of the floor, a runner pivotally connected to the bottom end thereof, means for rotating the post, and elastic loops anchored to the floor and including downward thrust upon the post.

HOWARD R. DAVIS.
THOMAS W. PRICE.